United States Patent
Col et al.

(10) Patent No.: US 7,039,793 B2
(45) Date of Patent: May 2, 2006

(54) MICROPROCESSOR APPARATUS AND METHOD FOR ACCELERATING EXECUTION OF REPEAT STRING INSTRUCTIONS

(75) Inventors: Gerard M. Col, Austin, TX (US); G. Glenn Henry, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 605 days.

(21) Appl. No.: 10/278,088

(22) Filed: Oct. 21, 2002

(65) Prior Publication Data

US 2005/0144426 A1    Jun. 30, 2005

Related U.S. Application Data

(60) Provisional application No. 60/345,460, filed on Oct. 23, 2001.

(51) Int. Cl.
*G06F 9/00* (2006.01)

(52) U.S. Cl. .................... 712/241; 712/243
(58) Field of Classification Search ........... 712/241, 712/243
See application file for complete search history.

(56) References Cited

U.S. PATENT DOCUMENTS

| 5,774,711 | A | * | 6/1998 | Henry et al. ............... 712/244 |
| 6,064,712 | A | * | 5/2000 | Diamondstein et al. ....... 377/15 |
| 6,560,697 | B1 | | 5/2003 | Sato |
| 2002/0194466 | A1 | | 12/2002 | Catherwood et al. |
| 2003/0093656 | A1 | | 5/2003 | Masse et al. |

OTHER PUBLICATIONS

IBM Technical Disclosure Bulletin, Aug. 1987, Title: Shadow General-Purpose Registers, TDB-ACC-NO: NN87081399.*

* cited by examiner

*Primary Examiner*—Eddie Chan
*Assistant Examiner*—Kevin Rizzuto
(74) *Attorney, Agent, or Firm*—Richard K. Huffman; James W. Huffman

(57) ABSTRACT

A method and apparatus are provided for processing repeat string instructions with increased efficiency in a processor pipeline. Rather than explicitly generating an initial count register setup micro instruction each time a repeat (REP) prefix in encountered, the processor includes a shadow ECX register operating in parallel with an architectural ECX count register. This enables the contents of the architectural ECX register, which are also stored in the shadow ECX register, to be immediately transferred to an internal count register from the shadow ECX register upon the first iteration of a repeat string micro code sequence.

10 Claims, 3 Drawing Sheets

MICROPROCESSOR APPARATUS AND METHOD FOR ACCELERATING EXECUTION OF REPEAT STRING INSTRUCTIONS

CROSS-REFERENCE TO RELATED APPLICATIONS

This application claims priority based on U.S. Provisional Application; Ser. No. 60/345,460, filed Oct. 23, 2001, entitled SHADOW COUNT FOR IMPROVED REPEAT STRING OPERATION.

BACKGROUND OF THE INVENTION

1. Field of the Invention

This invention relates in general to the field of instruction execution in computer systems, and more particularly to a method and apparatus for improving the performance of repeat string operations.

2. Description of the Related Art

Byte manipulation and string manipulation have always been important in computer processing. A primary application is in the area of text processing, which is the management of sequences of bytes that contain the alphanumeric codes for characters, i.e., character strings. In text processing it is essential to have program sequences for moving and comparing character strings, and for inserting strings into and deleting them from other strings. Moreover, it is often necessary to search a string for a given substring or to replace a substring with a different substring. Other applications requiring string manipulation include array processing, code conversion, and searching for keys in a file system.

To better understand string manipulation in microprocessors, the discussion below will employ the nomenclature of an x86 microprocessor. However, those skilled in the art will appreciate that use of x86 registers and macro instructions is for illustrative purposes only. Other processors or architectures may be easily substituted for this illustration.

String operations are used in microprocessors to move data from one location, the source address, to another location, the destination address. An x86 microprocessor provides a number of registers which are used to calculate: 1) the address of a byte or word which will be manipulated, i.e., the source address; 2) the address of a byte or word to which the source string will be moved, i.e., the destination address; and 3) the number of times the string operation must be repeated to manipulate the entire string. In a protected mode memory model, the source address for a string is found by adding the contents of the data segment base register DS with that of the source index register SI. The destination address for a string is found by adding the contents of the extra segment base register ES to the contents of the destination index register DI. Once a string operation is performed at a first source/destination address, the contents of SI and DI can be incremented or decremented, as specified by the programmer, and the operation repeated. By placing the string operation and increment/decrement steps within a loop, an entire string can be manipulated or transferred. The number of times the string instruction must be repeated is stored in general purpose architectural count register CX.

In an x86 microprocessor, all repeat string operations (i.e. REP INS, REP MOVS, REP OUTS, REP LODS, REPSTOS, REPE CMPS, REPA SCAS AND REPNE SCAS) repeat a specified string instruction a number of times equal to the number in the architectural count register ECX or until the indicated condition of the zero flag register (ZF) is no longer met. To begin a repeat string operation, the contents of register ECX are first loaded into a temporary count register (CNT). After each successful iteration of the string operation, temporary count register (CNT) is decremented. When the value in the CNT register reaches zero, or when the indicated ZF condition is met, the architectural count register ECX is updated with the contents of the temporary count register.

X86 microprocessors includes a translate stage which converts the repeat string macro instruction to a sequence of micro instructions. This sequence includes a count initialization instruction (LD CNT, ECX) followed by a subsequence of micro instructions that direct the microprocessor to perform the first iteration of the prescribed string operation. The translate stage then continues to repeatedly generate the same subsequence of micro instructions until execution logic in a later pipeline stage signals the translate stage that either 1) the number of generated subsequences is equal to the number of required interations, 2) that the prescribed ZF condition is no longer met, or 3) that an exception has occurred. The translate stage then generates an exit subsequence of micro instructions that directs the microprocessor to update architectural count register ECX with the final value of CNT upon exit.

Unfortunately, one significant disadvantage of the above method for performing repeat string operations is that the first micro instruction (LD CNT, ECX) generated by the translate stage is pure overhead. Although the first micro instruction is required to perform one or many string operations, its existence adds delay to the microprocessor pipeline and thus causes inefficiency.

Therefore, what is needed is a technique for operating a microprocessor that reduces or eliminates the delay associated with the first micro instruction that initiates the execution of a repeat string instruction.

SUMMARY OF THE INVENTION

In accordance with one embodiment of the present invention, an apparatus within a pipeline microprocessor is provided for expediting the execution of a repeat string operation. The apparatus includes an architectural count register, translation logic, and execution logic. The architectural count register stores a number of iterations for the repeat string operation. The translation logic generates a micro instruction having an initialization field, where the initialization field indicates the micro instruction is a first micro instruction of a sequence of micro direct instructions configured to direct the pipeline microprocessor to execute the repeat string operation, and where the initialization field indicates a first iteration of the repeat string operation. The execution logic receives and executes the micro instruction. The execution logic has a shadow count register that is coupled to the architectural count register and count update logic. The shadow count register stores the number of iterations as provided within the architectural count register. The count update logic is coupled to the shadow count register. The count update logic detects the initialization field, and transfers contents of the shadow count register to a temporary internal count register for use in executing the repeat string operation, whereby generation and execution of a load counter initialization instruction, configured to load the temporary internal count register with the number of iterations, is precluded.

Another aspect of the present invention contemplates a microprocessor apparatus for executing a repeat string instruction. The microprocessor apparatus includes a translator, a register stage, and an execute stage. The translator translates the repeat string instruction into a sequence of micro instructions. The sequence of micro instructions includes a first subsequence having an INIT field, where the INIT field indicates a first iteration of a repeat string operation directed by the repeat string instruction. The register stage is operatively coupled to the translator, where the register stage includes an architectural count register for storing a count value, the count value representing a number of iterations for the repeat string operation. The execute stage is operatively coupled to the translator, and executes the sequence of micro instructions. The execute a stage has a shadow register and count update logic. The shadow register is operatively coupled to the architectural count register, and stores the count value in parallel with the architectural count register. The count update logic is coupled to the shadow register. The count update logic detects the INIT field, and transfers contents of the shadow register to an internal count register for use in executing said repeat string operation, whereby generation and execution of a load counter initialization instructions, configured to load the internal count register with the count value, is precluded.

A further aspect of the present invention comprehends a method for executing a repeat string operation in a microprocessor. The method includes supplying an architectural count register with a count value denoting a number of times that a string operation is to be repeated; in parallel, providing the count value to a shadow count register, within a micro instruction, providing an initialization field that indicates an initial iteration of the repeat string operation; and detecting the initialization field and transferring contents of the shadow count register to an internal count register upon execution of the micro instruction that indicates the initial iteration; whereby generation and execution of a load counter initialization instruction, configured to load the internal count register with the number of times that the string operation is to be repeated, is precluded.

The disclosed processor exhibits the advantage that a time wasting micro instruction is not needed to initialize an internal count register with the contents of the architectural count register when a repeat string macro instruction is encountered.

Other features and advantages of the present invention will become apparent upon study of the remaining portions of the specification and drawings.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
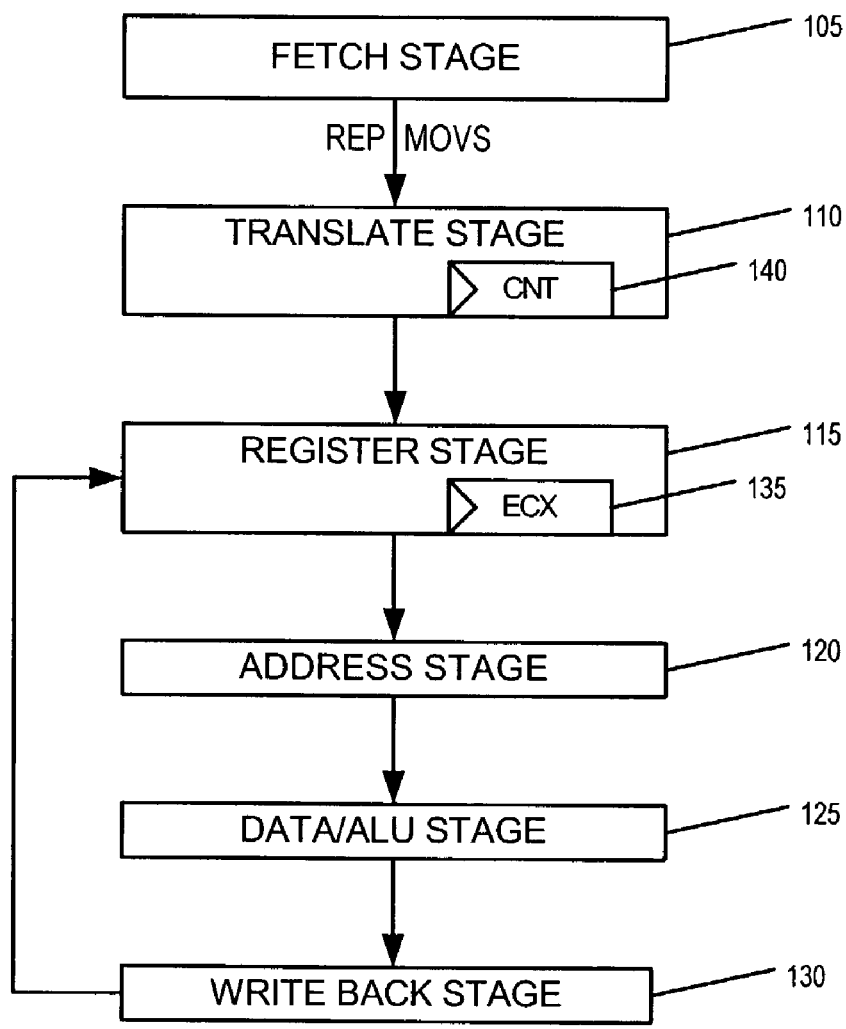
FIG. 1 is a block diagram of the pipeline stages of a conventional microprocessor.

FIG. 1 is a block diagram of a conventional pipelined microprocessor 100 which includes a fetch stage 105, a translate stage 110, a register stage 115, an address stage 120, a data/ALU or execute stage 125, and a write back stage 130.

Operationally, fetch stage 105 fetches macro instructions from memory (not shown) that are to be executed by microprocessor 100. Translate stage 110 translates the fetched macro instructions into associated micro instructions.

Each micro instruction directs microprocessor 100 to perform a specific subtask related to accomplishment of an overall operation specified by a fetched macro instruction. Register stage 115 retrieves operands specified by the micro instructions from a register file (not shown) for use by later stages in the pipeline. Address stage 120 calculates memory addresses specified by the micro instructions to be used in data storage and retrieval operations. Data/ALU stage 125 either performs arithmetic logic unit (ALU) operations on data retrieved from the register file, or reads/writes data from/to memory using the memory address calculated in address stage 120. Write back stage 130 writes the result of a data read operation, or an ALU operation, to the register file. Thus, to review, macro instructions are fetched by fetch stage 105 and are decoded into micro instructions by translate stage 110. The translated micro instructions proceed through stages 115–130 for execution. Pipeline operation is thus provided by microprocessor 100.

Register stage 115 includes an architectural count register 135 which is designated ECX. Register ECX stores a value equal to the number of times the repeat string operation is to be repeated until all the characters of the string are moved from the source address to the destination address. Translate stage 110 includes a temporary count register 140 which is designated CNT. When fetch stage 105 fetches a repeat string operation, such as REP MOVS for example, fetch stage 110 provides the fetched repeat string operation to translate stage 110. Translate stage 110 translates the repeat string macro instruction into a corresponding sequence of micro instructions which are fed forward to subsequent stages. The repeat string operation will be repeated the number of times specified in the ECX register. When the repeat string operation is initialized, the contents of the architectural count register ECX (135) are loaded into temporary count register CNT (140). After each successful iteration of the string operation, temporary count register CNT (140) is decremented. When the value in CNT finally reaches zero, the architectural count register ECX (135) is updated with the contents of temporary count register CNT (140).

With respect to micro instructions produced by translate stage 110 in response to a repeat string operation, the sequence associated with a repeat string operation includes a count initialization instruction, LD CNT, ECX. This causes the value in ECX register 135 to be loaded into CNT register 140. The LD CNT, ECX micro instruction is followed by a subsequence of microinstructions which direct the processor to carry out the first iteration of the specified repeat string operation. As mentioned earlier, translator 110 repeatedly generates the same subsequence of micro instructions until execution logic (not shown) in a later pipeline stage signals translate stage 110 that the number of generated subsequences is equal to the number of iterations required by the particular repeat string instruction. When this criterion is reached, translate stage 110 generates an exit sequence of micro instructions that, among other things, directs processor 100 to update the architectural count register ECX (135) with the final value stored in the temporary count register CNT (140) upon exit.

While this approach does serve the purpose of moving a string of prescribed length from a particular source address to a particular destination address, unfortunately the first micro instruction generated by translate stage 110, namely LD CNT, ECX is pure overhead. For this reason, a processor using this approach is less efficient that it might otherwise be.

The inventors of the technology disclosed herein have recognized that x86 repeat string operations always employ the contents of the ECX architectural count register as a count. The inventors have discovered that rather than explicitly generating an initial count register setup micro instruction (LD CNT, ECX) each time a repeat prefix is encountered, a superior approach is to provide a shadow ECX register that enables the contents of the architectural ECX register to be immediately transferred to the temporary internal count register CNT when the first iteration of a repeat string micro code sequence is executed.

Figure 2:
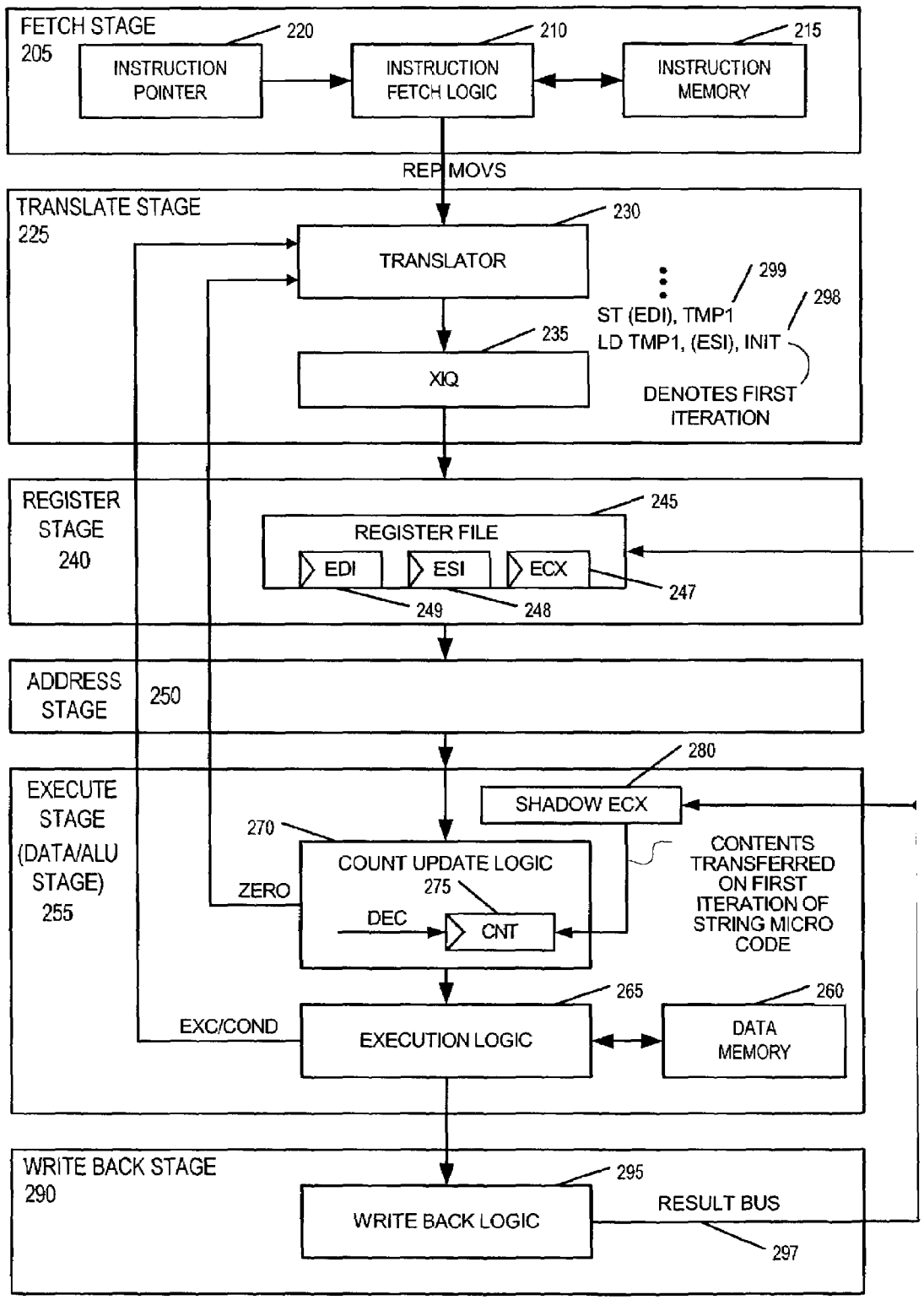
FIG. 2 is a block diagram of the disclosed microprocessor.

FIG. 2 shows a processor 200 which implements this advanced approach for repeat string or REP instructions. Processor 200 includes a fetch stage 205 which incorporates instruction fetch logic 210 coupled to instruction memory 215. An instruction pointer 220 is coupled to fetch logic 210 to instruct fetch logic 210 as to the particular location in memory 215 from which the current instruction is to be fetched. For purposes of example, it is assumed that the current instruction fetched from instruction memory 215 is a REP MOVS instruction, namely an instruction to repeat the move of string information from one location in memory to another locating in memory.

Instruction fetch logic 210 is coupled to a translate stage 225 such that the fetched instruction, namely REP MOVS, is provided to translator 230. Translator 230 translates the REP MOVS or other repeat string macro instruction into a sequence of micro instructions which are executed by the processor. The output of translator 230 is coupled to a translator instruction queue (XIQ) 235 where the micro instructions is passed along to the next stage, namely register stage 240, as will be described in more detail subsequently.

Register stage 240 stores the architectural state of the processor. A register file 245 is situated in register stage 240 as shown. Register file 245 includes architectural registers such as EAX, EBX, ECX and EDX, ESI and EDI for example, of which only architectural count register ECX 247, source address register ESI and destination address register EDI are shown for purposes of clarity. Register stage 240 retrieves operands specified by the micro instructions from register file 245 for use by later stages in the processor pipeline.

Register stage 240 is coupled forward to address stage 250 which calculates memory addresses specified by the micro instructions to be used in data storage and retrieval operations.

Address stage 250 is coupled forward to execute stage 255 which is also identified as the data/ALU stage. Execute stage 250 either performs arithmetic logic unit (ALU) operations on data retrieved from register file 245, or reads/writes data from/to data memory 260 using the memory address calculated in address stage 250. These ALU operations are performed by execution logic 265 which is coupled to data memory 260 as shown. Execution logic 265 includes an EXC/COND output which is coupled back to translator 230 to inform translator with an exception (EXC) or the occurrence of another condition (COND), for example the zero flag, ZF, reaching a one state has occurred.

Execute stage 255 also includes count update logic 270 in which a temporary count register CNT (275) is disposed. Temporary count register CNT (275) includes a decrement input DEC which decrements the count in register CNT (275) each time DEC is signaled to do so. A shadow count register ECX (280) is also included in execute stage 255 as shown. Shadow count register ECX (280) is coupled to count update logic 270 such that the contents of shadow count register (280) can be accessed by count update logic 270.

Execute stage 255 is coupled forward to write back stage 290 which includes write back logic 295 that writes the result of a data read operation, or an ALU operation, over a result bus 297 to the register file 245. Result bus 297 is coupled to both the architectural ECX register 247 in register file 245 and to shadow ECX register 280. Shadow ECX register 280 is updated over result bus 297 in parallel with updates to architectural ECX register 247. When translator 230 generates the first subsequence of micro instructions for a repeat string (REP) operation, an initialization field, INIT, is also provided as shown at the first micro instruction 298, namely LD TMP1, (ESI), INIT. The term INIT in the instruction signifies that this micro instruction is the first micro instruction of the sequence. Count update logic 270 detects this INIT field and transfers the contents of shadow ECX register 280 to temporary internal count register CNT (275). As subsequences of micro instructions fall through, count update logic 275 decrements count register CNT (275). When the contents of count register CNT (275) equal zero, the count update logic 270 signals translator 230 to stop generating micro code subsequences. Two other conditions can also instruct translator 230 to stop generating micro code subsequences. For repeat string operations involving the zero flag, ZF, execution logic 265 may signal translator 230 to stop generating micro instruction subsequences before CNT equals zero, if the prescribed ZF condition is satisfied. Also, exceptions can cause translation to cease.

In the example above, the first subsequence of micro instructions started with instruction 298, namely LD TMP1, (ESI), INIT. This instruction initializes a loop in which the contents of the address pointed to by the contents of ESI register 298 are stored in register TMP1. The next statement 299, namely ST (EDI), TMP1 transfers the contents of register TMP1 and stores the contents at the address pointed to by EDI register 249. The source and destination addresses are automatically advanced with each iteration of the loop until all of the contents of the prescribed string are operated on.

A representative example is now presented showing how the disclosed technology operates in conjunction with a sample string operation such as the MOVS instruction. The syntax of such an operation is REP MOVS dest, src wherein REP is the repeat string prefix, MOVS is the move string command, dest is the destination address and src is the source address. The MOVS operation copies the byte or word at the address stored in source register ESI (248) to the byte or word at the address stored in destination register EDI (249). When MOVS is preceded by the REP repeat string prefix, processor 200 will move ECX blocks of bytes or words from source, src, to destination, dest. Register ECX (247) is populated with the number of bytes or words to be moved. Since shadow register ECX 280 is shadowing ECX register 247, the ECX value from result bus 297 also populates shadow register ECX 280 in parallel. Thus when execute stage 255 starts to execute the REP string instruction, the value in architectural register ECX 247 is already in shadow register ECX 280. Since temporary count register CNT 275 is coupled to shadow register ECX 280, the value in architectural register 247 is also present in temporary count register CNT 275 when execute stage 255 begins executing the REP instruction. Thus, advantageously, there is no need for a load counter initialization instruction to load count register CNT 275 with the contents of architectural register ECX 247 because the value in the architectural register ECX 247 is already present in CNT register 275 through the action of shadow count register ECX 280. Unneeded overhead is thus effectively eliminated.

Each time a byte or word is moved, architectural register ECX 247 is decremented and in parallel shadow register ECX 280 is decremented, and both EDI and ESI (i.e. the destination and the source, respectively) are advanced automatically to the next address space which is to be the destination and source of the string data. This micro sequence forms a loop which continues until the value in the CNT register 275 is decremented to zero. Translator 230 is so informed by count update logic 270 when CNT reaches zero and in response stops generating micro instructions for this particular loop. At this point the full string has been transferred from the source address to the destination address and processor 200 moves on to process other instructions fetched from instruction memory 215.

In the example shown in translate stage 225 of FIG. 2, a loop is formed by the load micro instruction 298, LD TMP1, (ESI), INIT and the following store micro instruction 299, ST (EDI), TMP1. In this example, the load instruction operates on a non-architectural register TMP1 (not shown) in which is stored the contents pointed to by the address in ESI register 248. This is the first block of data that is to be written to a destination location. The INIT at the end of the load instruction means that this statement or instruction is the beginning of a loop. The store instruction, ST (EDI), TMP1 causes microprocessor 200 to store the contents of the TMP1 register at the address pointed to be the contents of EDI register 249. This load and store micro sequence will continue with the address of ESI (source) and EDI (destination) advancing with each iteration until the value in CNT register 275 equals zero. The zero state of the CNT register 275 is sensed by translator 225, which is coupled to the ZERO output of count update logic 270, and when this condition occurs translator 230 stops the loop and issues an exit micro sequence.

It is noted that the REP repeat string instruction can be coupled with any string operation such as with MOVS, MOVSB—move byte, MOVW—move word, and MOVD—move double word, for example. This list is not exhaustive of the string operations upon which the REP repeat string instruction can operate. Using the disclosed technology, the need for a load CNT initiation instruction can be eliminated for a repeat of any of these string operations.

Figure 3:
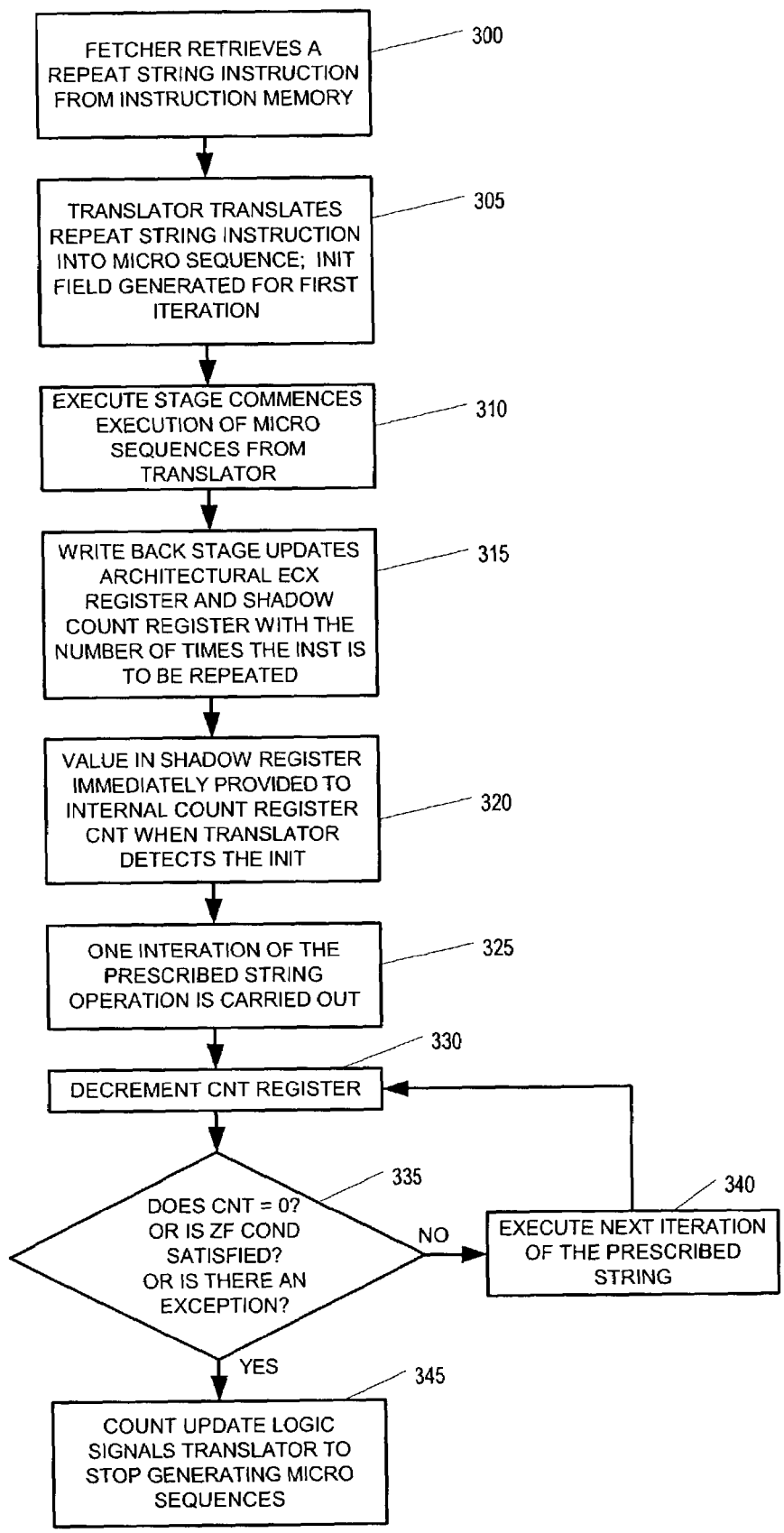
FIG. 3 is a flow chart depicting the operation of disclosed microprocessor when it encounter a repeat string instruction.

FIG. 3 is a flowchart depicting process flow of microprocessor 200 as it carries out a repeat string operation in accordance with the advanced methodology disclosed. The fetcher retrieves a repeat string macro instruction from instruction memory as per block 300. The translator translates the repeat string instruction into a micro sequence as per block 305. The first instruction of the micro sequence contains an INIT field. The execution stage then commences execution of micro sequences from the translator as per block 310. The write back stage updates both the architectural ECX register and the shadow count register with the number of times the instruction is to be repeated as per block 315. Advantageously, the value in the shadow count register is immediately provided to the internal count register CNT as per block 320. The need for an initiating load instruction and the resultant delay is thus avoided. One iteration of the prescribed string operation, for example a MOVS, is carried out as per block 325. The internal count register CNT is decremented as per block 330 and a test is now conducted at decision block 335 to determine if the value in CNT=0. If the value in count register CNT is not equal to zero, that indicates that more interations of the string operation are to be conducted before action on the subject string is complete. Thus if CNT does not equal zero, flow continues and the next iteration of the prescribed string operation is executed as indicated in block 340. Flow then continues back to block 330 at which the CNT register is again decremented and another test is conducted at decision block 335 to determine if iterations of the prescribed string operation are now complete. Once CNT is found in block 335 to be equal to zero, this indicates that iterations of the string instruction are now complete and flow continues to block 345 at which count update logic signals the translator to stop generating micro sequences. It is noted that the generation of micro sequences is also stopped if in decision block 335 it is found that the zero flag (ZF) flag condition flag is no longer satisfied or an exception has occurred.

The above description with reference to FIGS. 2–3 has illustrated an apparatus and a method for increasing the efficiency of a processor which is executing repeat string instructions. Rather than explicitly generating an initial count register setup micro instruction such as LD CNT, ECX with its concomitant delay each time a repeat prefix is encountered, the described embodiment provides a shadow ECX register. The shadow ECX register enables the contents of the architectural ECX register to be effectively immediately transferred to the internal count register CNT when the first iteration of a repeat string micro code sequence is executed. This eliminates the time penalty associated with the LD CNT, ECX instruction employed in the micro sequences of conventional processors while executing a repeat string instruction.

Although the present invention and its objects, features, and advantages have been described in detail, other embodiments are encompassed by the invention. In addition to implementations of the invention using hardware, the invention can be embodied in computer readable program code (e.g., software) disposed, for example, in a computer usable (e.g., readable) medium configured to store the code. The code causes the enablement of the functions, fabrication, modeling, simulation and/or testing, of the invention disclosed herein. For example, this can be accomplished through the use of computer readable program code in the form of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a processor that is embodied in code (e.g., HDL, GDSII, etc.) and may be transformed to hardware as part of the production of integrated circuits. Also, the invention may be embodied as a combination of hardware and code.

Moreover, although the present invention has been described with reference to particular apparatus and method, other alternative embodiments may used without departing from the scope of the invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus within a pipeline microprocessor for expediting the execution of a repeat string operation, the apparatus comprising:

an architectural count register, configured to store a number of iterations for the repeat string operation;

translation logic, configured to generate a micro instruction having an initialization field, wherein said initialization field indicates said micro instruction is a first micro instruction of a sequence of micro instructions configured to direct the pipeline microprocessor to execute the repeat string operation, and wherein said initialization field indicates a first iteration of the repeat string operation; and execution logic, configured to receive and execute said micro instruction, wherein said execution logic comprises:

a shadow count register, coupled said architectural count register, configured to store said number of iterations as provided within said architectural count register; and count update logic, coupled to said shadow count register, configured to detect said initialization field and configured to transfer contents of said shadow count register to a temporary internal count register for use in executing the repeat string operation, whereby generation and execution of a load counter initialization instruction, configured to load said temporary internal count register with said number of iterations, is precluded.

2. The apparatus as recited in claim 1 wherein said number of iterations within said shadow count register is decremented for each iteration of the repeat string operation.

3. The apparatus as recited in claim 1 wherein said architectural count register comprises:

an ECX register within an x86-compatible microprocessor.

4. A microprocessor apparatus for executing a repeat string instruction, the microprocessor apparatus comprising:

a translator, for translating the repeat string instruction into a sequence of micro instructions, said sequence of micro instructions comprising:

a first subsequence comprising an INIT field, wherein said INIT field indicates a first iteration of a repeat string operation directed by the repeat string instruction;

a register stage, operatively coupled to said translator, wherein said register stage comprises an architectural count register for storing a count value, said count value representing a number of iterations for said repeat string operation; and an execute stage, operatively coupled to said translator, for executing said sequence of micro instructions, said execute stage comprising:

a shadow register, operatively coupled to said architectural count register, for storing said count value in parallel with said architectural count register; and count update logic, coupled to said shadow register, configured to detect said INIT field, and configured to transfer contents of said shadow register to an internal count register for use in executing said repeat string operation, whereby generation and execution of a load counter initialization instruction, configured to load said internal count register with said count value, is precluded.

5. The microprocessor apparatus as recited in claim 4, wherein said internal count register is decremented upon each iteration of the repeat string operation.

6. The microprocessor apparatus as recited in claim 5, wherein decrementing of said internal count register continues for each iteration of the repeat string operation until contents of said internal count register equal zero.

7. The microprocessor apparatus as recited in claim 4, wherein said architectural count register comprises register ECX within an x86-compatible microprocessor.

8. A method for executing a repeat string operation in a microprocessor, the method comprising:

supplying an architectural count register with a count value denoting a number of times that a string operation is to be repeated;

in parallel, providing the count value to a shadow count register;

within a micro instruction, providing an initialization field that indicates an initial iteration of the repeat string operation; and detecting the initialization field and transferring contents of the shadow count register to an internal count register upon execution of the micro instruction that indicates the initial iteration;

whereby generation and execution of a load counter initialization instruction, configured to load the internal count register with the number of times that the string operation is to be repeated, is precluded.

9. The method as recited in claim 8, wherein the architectural count register comprises an register ECX within an x86-compatible microprocessor.

10. The method as recited in claim 8, further comprising:

decrementing the internal count register with each iteration of the repeat string operation until the value in the internal count register is zero.

* * * * *